US008782005B2

(12) United States Patent
Barnes et al.

(10) Patent No.: US 8,782,005 B2
(45) Date of Patent: Jul. 15, 2014

(54) PRUNING PREVIOUSLY-ALLOCATED FREE BLOCKS FROM A SYNTHETIC BACKUP

(71) Applicant: Storagecraft Technology Corporation, Draper, UT (US)

(72) Inventors: Scott Barnes, Draper, UT (US); Maxim Shatskikh, Moscow (RU); Nathan S. Bushman, Pleasant Grove, UT (US)

(73) Assignee: Storagecraft Technology Corporation, Draper, UT (US)

( * ) Notice: Subject to any disclaimer, the term of this patent is extended or adjusted under 35 U.S.C. 154(b) by 0 days.

(21) Appl. No.: 13/712,065

(22) Filed: Dec. 12, 2012

(65) Prior Publication Data
US 2014/0164330 A1    Jun. 12, 2014

(51) Int. Cl.
*G06F 17/30* (2006.01)

(52) U.S. Cl.
CPC .................. *G06F 17/3007* (2013.01)
USPC ........... 707/646; 707/649; 707/650; 707/653; 707/655

(58) Field of Classification Search
CPC .................. G06F 17/30; G06F 17/00
See application file for complete search history.

(56) References Cited

U.S. PATENT DOCUMENTS

| | | | | |
|---|---|---|---|---|
| 5,398,142 A * | 3/1995 | Davy | ............................. | 360/48 |
| 5,435,004 A * | 7/1995 | Cox et al. | ............................. | 1/1 |
| 5,457,796 A * | 10/1995 | Thompson | ............................. | 1/1 |
| 5,535,381 A * | 7/1996 | Kopper | ............................. | 710/52 |
| 5,546,534 A * | 8/1996 | Malcolm | ............................. | 714/6.3 |
| 5,737,763 A * | 4/1998 | Hilditch | ............................. | 711/162 |
| 6,023,710 A * | 2/2000 | Steiner et al. | ............................. | 1/1 |
| 6,061,770 A * | 5/2000 | Franklin | ............................. | 711/162 |
| 6,073,222 A * | 6/2000 | Ohran | ............................. | 711/162 |
| 6,161,111 A * | 12/2000 | Mutalik et al. | ............................. | 707/823 |
| 6,208,999 B1 * | 3/2001 | Spilo et al. | ............................. | 1/1 |
| 6,269,381 B1 * | 7/2001 | St. Pierre et al. | ............................. | 1/1 |
| 6,397,308 B1 * | 5/2002 | Ofek et al. | ............................. | 711/162 |
| 7,266,655 B1 * | 9/2007 | Escabi et al. | ............................. | 711/162 |
| 7,467,329 B1 * | 12/2008 | Keeton et al. | ............................. | 714/15 |
| 7,536,585 B1 * | 5/2009 | Keeton et al. | ............................. | 714/47.2 |
| 7,581,077 B2 * | 8/2009 | Ignatius et al. | ............................. | 711/202 |
| 7,634,679 B2 * | 12/2009 | Quintiliano | ............................. | 714/4.11 |
| 7,644,046 B1 * | 1/2010 | Keeton et al. | ............................. | 705/400 |
| 7,685,171 B1 * | 3/2010 | Beaverson et al. | ............................. | 707/999.202 |
| 7,756,833 B2 * | 7/2010 | Van Ingen et al. | ............................. | 707/640 |
| 7,802,134 B1 * | 9/2010 | Sobel et al. | ............................. | 714/15 |
| 7,822,717 B2 * | 10/2010 | Kapoor et al. | ............................. | 707/680 |
| 7,987,326 B2 * | 7/2011 | Nguyen | ............................. | 711/162 |
| 8,019,963 B2 * | 9/2011 | Ignatius et al. | ............................. | 711/202 |
| 8,041,907 B1 * | 10/2011 | Wu et al. | ............................. | 711/161 |
| 8,060,475 B1 * | 11/2011 | Tsaur et al. | ............................. | 707/641 |
| 8,060,481 B1 * | 11/2011 | Harmer et al. | ............................. | 707/695 |
| 8,209,298 B1 * | 6/2012 | Anglin et al. | ............................. | 707/674 |

(Continued)

*Primary Examiner* — Farhan Syed
(74) *Attorney, Agent, or Firm* — Maschoff Brennan (57) ABSTRACT

Pruning previously-allocated free blocks from a synthetic backup. In one example embodiment, a method of pruning previously-allocated free blocks from a synthetic backup includes identifying multiple sequential backups to be included in a synthetic backup, accessing a copy of a file system block allocation map (FSBAM) of the most recent of the multiple sequential backups that was stored with the most recent backup, identifying a set of blocks that includes the most recent block for each unique block position contained within the multiple sequential backups, pruning the set of blocks to exclude all blocks that are identified as being free in the FSBAM, storing the pruned set of blocks in the synthetic backup, and storing a copy of the FSBAM with the synthetic backup.

16 Claims, 4 Drawing Sheets

(56) References Cited

U.S. PATENT DOCUMENTS

| | | | |
|---|---|---|---|
| 8,239,654 B2* | 8/2012 | Ignatius et al. | 711/202 |
| 8,307,176 B1* | 11/2012 | Wu et al. | 711/161 |
| 8,335,770 B2* | 12/2012 | Merchant et al. | 707/682 |
| 2004/0193953 A1* | 9/2004 | Callahan et al. | 714/15 |
| 2005/0268068 A1* | 12/2005 | Ignatius et al. | 711/202 |
| 2006/0064444 A1* | 3/2006 | van Ingen et al. | 707/204 |
| 2006/0173935 A1* | 8/2006 | Merchant et al. | 707/204 |
| 2007/0276885 A1* | 11/2007 | Valiyaparambil et al. | 707/204 |
| 2008/0086609 A1* | 4/2008 | Lesser et al. | 711/162 |
| 2008/0243954 A1* | 10/2008 | Augenstein et al. | 707/204 |
| 2008/0294859 A1* | 11/2008 | Nguyen | 711/162 |
| 2009/0307251 A1* | 12/2009 | Heller et al. | 707/101 |
| 2010/0042804 A1* | 2/2010 | Ignatius et al. | 711/202 |
| 2010/0076934 A1* | 3/2010 | Pershin et al. | 707/640 |
| 2010/0114828 A1* | 5/2010 | Persson | 707/640 |
| 2010/0162039 A1* | 6/2010 | Goroff et al. | 714/6 |
| 2011/0302383 A1* | 12/2011 | Ignatius et al. | 711/162 |
| 2012/0158666 A1* | 6/2012 | Anglin et al. | 707/679 |
| 2013/0013618 A1* | 1/2013 | Heller et al. | 707/747 |

* cited by examiner

PRUNING PREVIOUSLY-ALLOCATED FREE BLOCKS FROM A SYNTHETIC BACKUP

FIELD

The embodiments disclosed herein relate to pruning previously-allocated free blocks from a synthetic backup.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of blocks that are allocated to each file that is stored in the storage as well as the locations of allocated blocks which are used by the file system for its own internal on-storage structures. The file system may also track free blocks that are neither allocated to any file nor allocated to any file system on-storage structure. The file system generally tracks allocated and/or free blocks using a specialized on-storage structure stored in file system metadata, referred to herein as a file system block allocation map (FSBAM).

Various techniques exist for backing up a source storage. One common technique involves backing up individual files stored in the source storage on a per-file basis. This technique is often referred to as file backup. File backup uses the file system of the source storage as a starting point and performs a backup by writing the files to a backup storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the backup storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system on-storage structures such as the FSBAM. Also, because image backup backs up all allocated blocks rather than individual files, this approach does not necessarily need to be aware of the file system on-storage data structures or the files stored in the source storage, beyond utilizing the FSBAM in order to only back up allocated blocks since free blocks are not generally backed up.

An image backup can be relatively fast compared to file backup because reliance on the file system is minimized. Further, the use of snapshot technology during an image backup may enable an image backup to capture the data stored in a source storage at a particular point in time without interrupting other processes, thus avoiding downtime of the source storage.

One common problem encountered when repeatedly backing up a source storage using image backup is the potential for the inclusion of previously-allocated free blocks in successive backups. For example, a very large digital movie file may initially be stored on a source storage. The allocated blocks that correspond to the movie file may then be stored in an initial backup of the source storage. After the creation of the initial backup, the movie file may then be deleted from the source storage, thus rendering the corresponding blocks as previously-allocated free blocks. When a new backup is subsequently created, and the new backup is combined with the initial backup in a synthetic backup, the previously-allocated free blocks corresponding to the deleted movie file may be needlessly retained in the synthetic backup. Retaining previously-allocated free blocks in a synthetic backup may increase the overall size requirements of a backup storage where the synthetic backup is stored, increase the bandwidth overhead of transporting the synthetic backup, increase the processing time associated with collapsing the synthetic backup into subsequent synthetic backups, and increase the processing time associated with restoring the synthetic backup.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to pruning previously-allocated free blocks from a synthetic backup. The example methods disclosed herein may be employed to prune previously-allocated free blocks from a synthetic backup during the creation of the synthetic backup. The pruning of the example methods disclosed herein may decrease the overall size requirements of a backup storage where a synthetic backup is stored, decrease the bandwidth overhead of transporting the synthetic backup, decrease the processing time associated with collapsing the synthetic backup into subsequent synthetic backups, and decrease the processing time associated with restoring the synthetic backup.

In one example embodiment, a method of pruning free blocks from a synthetic backup includes identifying multiple sequential backups to be included in a synthetic backup, accessing a file system block allocation map (FSBAM) of the most recent of the multiple sequential backups, identifying a set of blocks that includes the most recent block for each unique block position contained within the multiple sequential backups, with the set of blocks being pruned to exclude all blocks that are identified as being free in the FSBAM, and storing the pruned set of blocks in the synthetic backup.

In another example embodiment, a method of pruning previously-allocated free blocks from a synthetic backup includes identifying multiple sequential backups to be included in a synthetic backup, accessing an FSBAM of the most recent of the multiple sequential backups, identifying a set of blocks that includes the most recent block for each unique block position contained within the multiple sequential backups, pruning the set of blocks to exclude all blocks that are identified as being free in the FSBAM, and storing the pruned set of blocks in the synthetic backup.

In yet another example embodiment, a method of pruning previously-allocated free blocks from a synthetic backup includes identifying multiple sequential backups to be included in a synthetic backup, accessing a copy of an FSBAM of the most recent of the multiple sequential backups that was stored with the most recent backup, identifying a set of blocks that includes the most recent block for each unique block position contained within the multiple sequential backups, pruning the set of blocks to exclude all blocks that are identified as being free in the FSBAM, storing the pruned set of blocks in the synthetic backup, and storing a copy of the FSBAM with the synthetic backup.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein include pruning previously-allocated free blocks from a synthetic backup. The example methods disclosed herein may be employed to prune previously-allocated free blocks from a synthetic backup during the creation of the synthetic backup. The pruning of the example methods disclosed herein may decrease the overall size requirements of a backup storage where a synthetic backup is stored, decrease the bandwidth overhead of transporting the synthetic backup, decrease the processing time associated with collapsing the synthetic backup into subsequent synthetic backups, and decrease the processing time associated with restoring the synthetic backup.

The term "storage" as used herein refers to computer-readable media, or some logical portion thereof such as a volume, capable of storing data in blocks. The term "block" as used herein refers to a fixed-length discrete sequence of bits. The term "allocated block" as used herein refers to a block in a storage that is currently employed and tracked as storing data by a file system of the storage. The term "free block" as used herein refers to a block in a storage that is not currently employed nor tracked as storing data by a file system of the storage. The term "backup" when used herein as a noun refers to a copy or copies of one or more blocks from a storage. The term "base backup" as used herein refers to a full backup of a storage that includes at least a copy of each unique allocated block of the storage at a point in time such that the base backup can be restored to recreate the state of the storage at the point in time. A "base backup" may also include nonunique allocated blocks and free blocks of the storage at the point in time. The term "incremental backup" as used herein refers to a partial backup of a storage that includes at least a copy of each unique allocated block of the storage that changed between a previous point in time of a previous backup of the storage and the subsequent point in time of the incremental backup such that the incremental backup, along with all previous backups of the storage including an initial base backup of the storage, can be restored together to recreate the exact state of the storage at the subsequent point in time. An "incremental backup" may also include nonunique allocated blocks and free blocks of the storage that changed between the previous point in time and the subsequent point in time. Only "unique allocated blocks" may be included in a "base backup" or an "incremental backup" where only a single copy of multiple duplicate allocated blocks (i.e. nonunique allocated blocks) is backed up to reduce the size of the backup. A "base backup" or an "incremental backup" may exclude certain undesired allocated blocks such as blocks of data belonging to files whose contents are not necessary for restoration purposes, such as virtual memory pagination files and machine hibernation state files. The term "synthetic backup" as used herein refers to a backup that is created by combining copies of blocks from a combination of multiple sequential backups of a storage into a single backup. The term "file system block allocation map" or "FSBAM" as used herein refers to a map maintained by a file system of a storage that tracks, at any given point in time, which blocks of the storage are allocated and/or which blocks of the storage are free.

Figure 1:
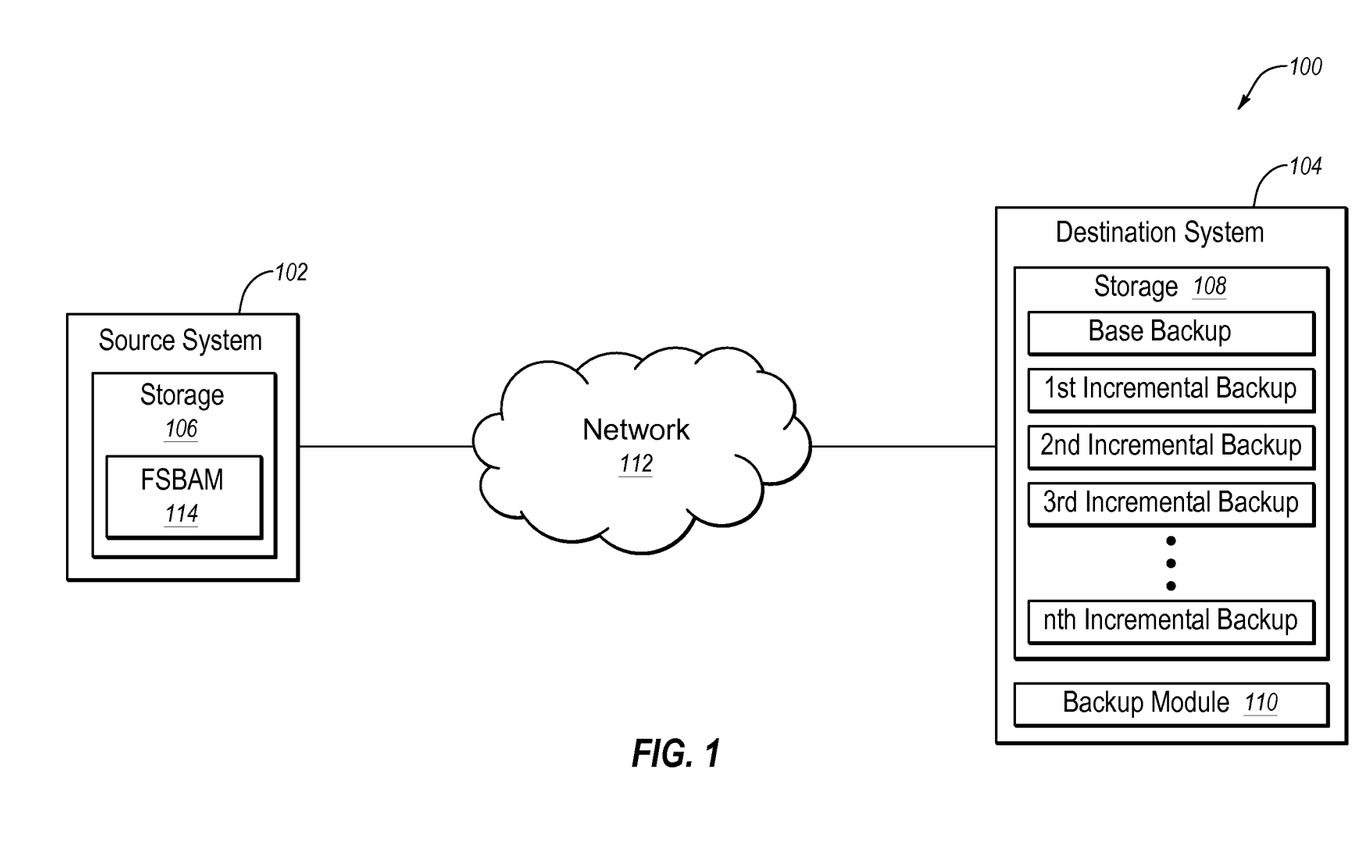
FIG. 1 is a schematic block diagram illustrating an example backup system.

FIG. 1 is a schematic block diagram illustrating an example backup system 100. As disclosed in FIG. 1, the example backup system 100 includes a source system 102 and a backup system 104. The systems 102 and 104 include storages 106 and 108, respectively. The backup storage 108 stores a base backup and multiple incremental backups that have been created of the source storage 106 at various points in time. The backup system 104 also includes a backup module 110. The systems 102 and 104 are able to communicate with one another over a network 112.

Each of the systems 102 and 104 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, and flash memory drives. The network 112 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

During performance of the example methods disclosed herein, the backup module 110 may identify multiple sequential backups, such as two or more of the backups of the source storage 106 that are stored in the backup storage 108, to be included in a synthetic backup. The backup module 110 may then identify a set of blocks that includes the most recent block for each unique block position contained within the multiple sequential backups. The backup module 110 may next access the FSBAM of the most recent of the multiple sequential backups in order to prune the set of blocks to exclude all blocks that are identified as being free in the FSBAM. The backup module 110 may then store the pruned set of blocks in the synthetic backup. As discussed in greater detail below, pruning the previously-allocated free blocks from a synthetic backup may decrease the overall size requirements of the backup storage 108 where the synthetic backup is stored, decrease the bandwidth overhead of transporting the synthetic backup, decrease the processing time associated with combining the synthetic backup into subsequent synthetic backups, and decrease the processing time associated with restoring the synthetic backup.

In one example embodiment, the source system 102 may be a desktop computer, the backup system 104 may be a file server, and the network 112 may include the internet. In this example embodiment, the file server may be configured to periodically back up the storage of the desktop computer over the internet. The file server may also be configured to periodically combine multiple sequential backups into a synthetic backup. The file server may also be configured to restore any one of the backups to the storage of the desktop computer over the internet if the desktop computer experiences corruption or a user simply desires to restore the storage of the desktop computer to an earlier point in time.

Although only a single storage is disclosed in each of the systems 102 and 104 in FIG. 1, it is understood that any of the systems 102 and 104 may instead include two or more storages. Further, although the systems 102 and 104 are disclosed in FIG. 1 as communicating over the network 112, it is understood that the systems 102 and 104 may instead communicate directly with each other. For example, in some embodiments the systems 102 and 104 may be combined into a single system. Also, although the storages 106 and 108 are disclosed as separate storages, it is understood that the storages 106 and 108 may be combined into a single storage. For example, in some embodiments a first volume of the source storage 106 may function as a source storage during the creation of a backup that is stored in a second volume of the source storage 106. Subsequently, the backup stored in the second volume may be restored to the first volume, which may enable the first volume of the source storage 106 to be restored to a state of an earlier point in time. Further, although the backup module 110 is the only module disclosed in the example backup system 100 of FIG. 1, it is understood that the functionality of the backup module 110 may be replaced or augmented by one or more similar modules residing on either of the systems 102 and 104 or another system. Finally, although only a single source storage is disclosed in the example backup system 100 of FIG. 1, it is understood that the backup system 104 of FIG. 1 may be configured to simultaneously back up or restore multiple source storages.

Having described one specific environment with respect to FIG. 1, it is understood that the specific environment of FIG. 1 is only one of countless environments in which the example methods disclosed herein may be employed. The scope of the example embodiments is not intended to be limited to any particular environment.

Figure 2:
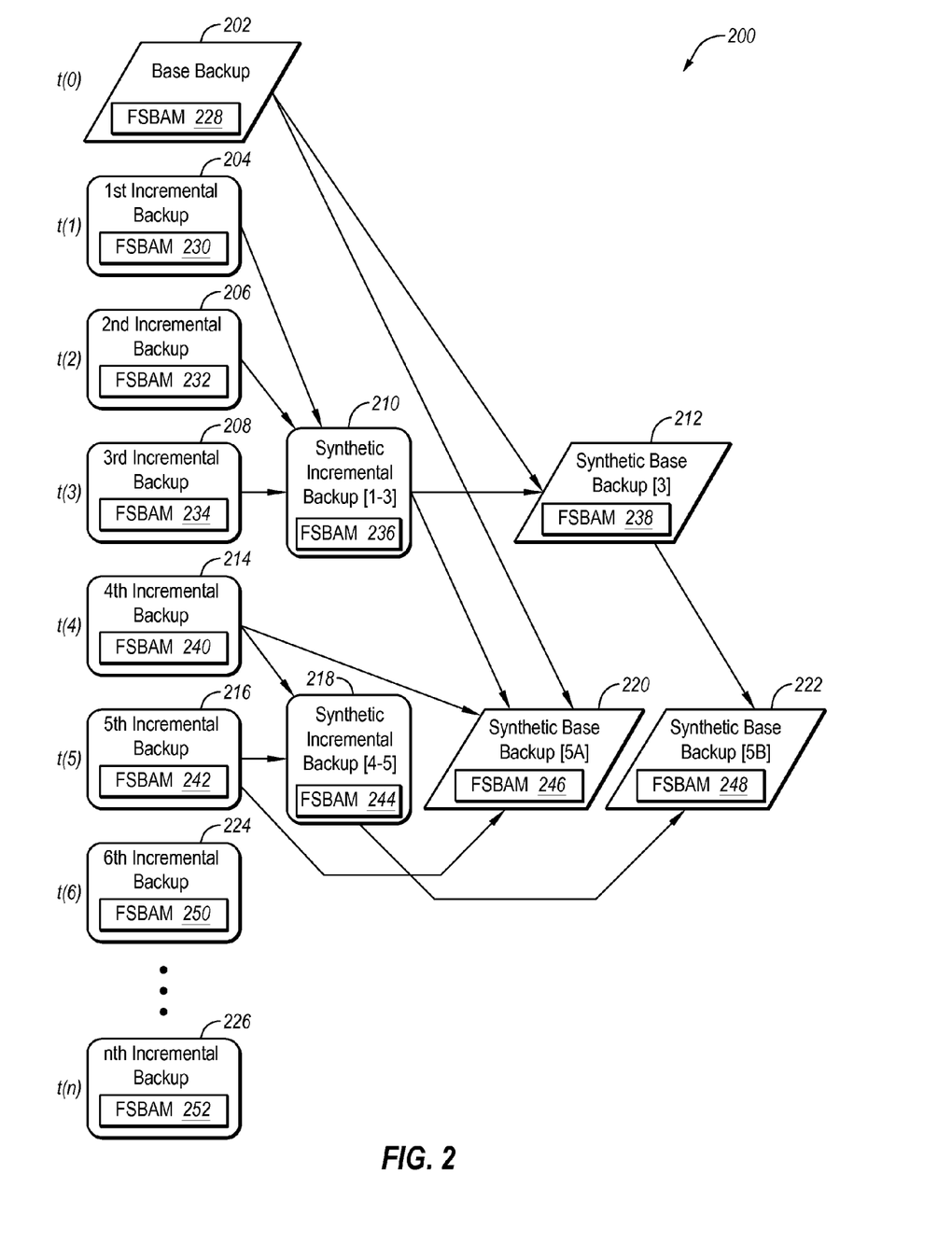
FIG. 2 is a schematic flowchart illustrating an example method for creating a base backup, multiple incremental backups, multiple synthetic base backups, and multiple synthetic incremental backups of a source storage.

FIG. 2 is a schematic flowchart illustrating an example method 200 for creating a base backup, multiple incremental backups, multiple synthetic base backups, and multiple synthetic incremental backups of the source storage 106 of the source system 102 of FIG. 1. The method 200 may be implemented, in at least some embodiments, by the backup module 110 of the backup system 104 of FIG. 1. For example, the backup module 110 may be configured to execute computer instructions to perform operations of creating a base backup, multiple incremental backups, multiple synthetic base backups, and multiple synthetic incremental backups of the source storage 106, as represented by the method 200. The method 200 will now be discussed with reference to FIGS. 1 and 2.

The method 200 may begin at step 202, in which the backup module 110 creates a base backup to capture the state of the source storage 106 at time t(0). The base backup may include all allocated blocks of the source storage 106 as allocated at time t(0). During the creation of base backup and each of the incremental backups in the method 200, an FSBAM 114 of the source storage 106 may be accessed at the time of the backup to determine which of the blocks of the source storage 106 are allocated at the time of the backup. The backup module 110 may store the base backup, and all other backups created during the method 200, in the backup storage 108. The base backup may be very large depending on the size of the source storage 106 and the number of allocated blocks at time t(0). As a result, the base backup may take a relatively long time to create and consume a relatively large amount of space in the backup storage 108.

At step 204, the backup module 110 creates a 1st incremental backup to capture the state of the source storage 106 at time t(1). The 1st incremental backup may include all allocated blocks of the source storage 106 that changed between time t(0) and time t(1). In general, as compared to the base backup, the 1st incremental backup may take a relatively short time to create and consume a relatively small amount of storage space in the backup storage 108.

At steps 206 and 208, the backup module 110 creates 2nd and 3rd incremental backups to capture the states of the source storage 106 at times t(2) and t(3), respectively. The 2nd incremental backup may include all allocated blocks of the source storage 106 that changed between time t(1) and time t(2). Similarly, the 3rd incremental backup may include all allocated blocks of the source storage 106 that changed between time t(2) and time t(3).

At step 210, the backup module 110 creates synthetic incremental backup [1-3]. The label "[1-3]" indicates that the synthetic incremental backup [1-3] includes data from the 1st through 3rd incremental backups.

In general, the creation of synthetic backups may be useful in order to combine multiple backups of a source storage created at different points in time into a single backup. Since restoring a fewer number of backups stored in a backup storage is generally faster than restoring a greater number of backups, the creations of synthetic backups, and the resulting decrease in the number of backups, may result in faster restore of the backups should the need arise for a restoration of the source storage. Also, once a backup has been combined with other sequential backups into a synthetic backup, the original backups may be deleted from the backup storage, thereby decreasing the overall size requirements of the backup storage where the synthetic backup is stored.

Figure 3:
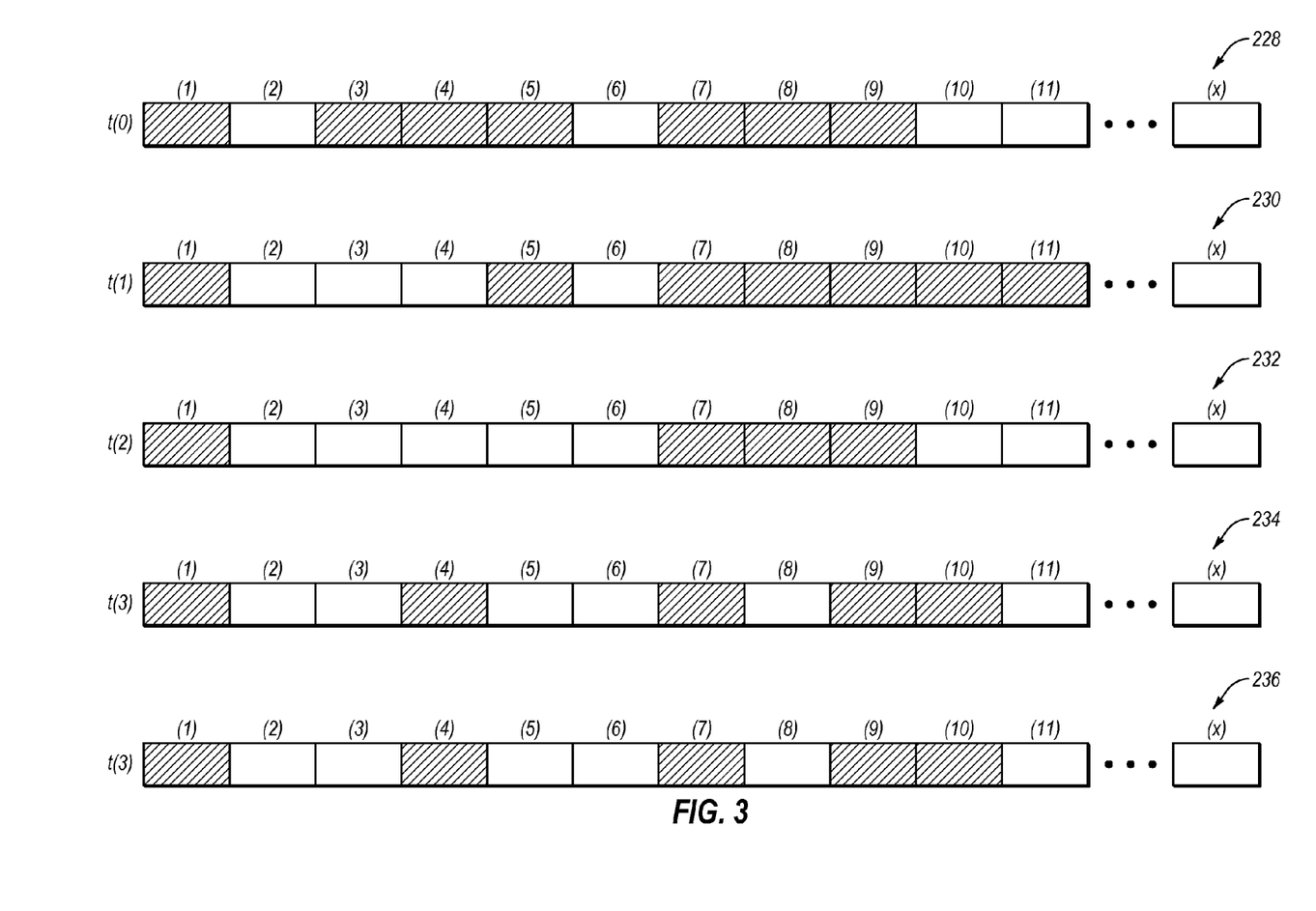
FIG. 3 is a schematic flowchart illustrating copies of a file system block allocation map (FSBAM) of a source storage at various points in time that were stored with backups of the source storage.

In addition to the general usefulness of synthetic backups noted above, the creation of a synthetic backup during the method 200 may include pruning of previously-allocated free blocks, which may decrease the overall size requirements of the backup storage 108 where the synthetic backup is stored, decrease the bandwidth overhead of transporting the synthetic backup, decrease the processing time associated with collapsing the synthetic backup into subsequent synthetic backups, and decrease the processing time associated with restoring the synthetic backup, as discussed in greater detail below in connection with FIG. 3.

The backup module 110 creates the synthetic incremental backup [1-3] at step 210 by combining copies of blocks from the sequential 1st, 2nd, and 3rd incremental backups into a single backup. As noted previously, during the creation of the base backup and each of the 1st, 2nd, and 3rd incremental backups during the method 200, the FSBAM 114 of the source storage 106 may be accessed at the time of the backup to determine which of the blocks of the source storage 106 is allocated at the time of the backup. Also during the creation of each of these backups, copies of the FSBAM 114, namely FSBAMs 228-234 may be stored in the backup storage 108, along with these backups, respectively, so as to be accessible to the backup module 110 during the subsequent creation of synthetic backups. For example, during the creation of the synthetic incremental backup [1-3] at step 210, the FSBAM 234, which is a copy of the FSBAM 114 at time t(3), may be accessed by the backup module 110.

The backup module 110 may access the FSBAM 234 due to the FSBAM 234 being stored with the 3rd incremental backup. For example, the FSBAM 234 may be stored with the 3rd incremental backup as a separate data structure and the backup module 110 may directly access the FSBAM 234. Alternatively or additionally, the FSBAM 234 may be stored with the 3rd incremental backup by the FSBAM 234 being embedded in the 3rd incremental backup. The backup module 110 may then access the FSBAM 234 by mounting the 3rd incremental backup as a virtual device and then querying a file system driver of the virtual device to expose the FSBAM 234 embedded in the mounted 3rd incremental backup. Alternatively or additionally, where the FSBAM 234 is stored with the 3rd incremental backup by the FSBAM 234 being embedded in the 3rd incremental backup, the backup module 110 may parse the file system metadata contained within the 3rd incremental backup to directly access the FSBAM 234 that is embedded therein. It is understood that in some embodiments two copies of the FSBAM 234 may be stored with the 3rd incremental backup, such as where a first copy of the FSBAM 234 is stored with the 3rd incremental backup by being embedded in the 3rd incremental backup and a second copy of the FSBAM 234 is stored with the 3rd incremental backup by being stored with the 3rd incremental backup as a separate data structure. In these embodiments, any of the three options listed above for accessing the FSBAM 234 may be available.

The backup module 110 may access the FSBAM 234 during the creation of the synthetic incremental backup [1-3], since the FSBAM 234 is the FSBAM of the most recent backup in the sequential 1st, 2nd, and 3rd incremental backups that have been identified for inclusion in the synthetic incremental backup [1-3], and thus is the relevant FSBAM for the state of the source storage at time t(3). The backup module 110 may access the FSBAM 234 in order to exclude from the synthetic incremental backup [1-3] all blocks from the 1st, 2nd, and 3rd incremental backups that were previously allocated at the times of previous backups but are now identified as being free in the FSBAM 234 of the most recent backup. Excluding blocks identified as free in the FSBAM 234 may reduce the size of the synthetic incremental backup [1-3], as discussed in greater detail below in connection with FIG. 3. It is noted that during the creation of the synthetic incremental backup [1-3], a copy of the FSBAM 234 may be stored in the backup storage 108, along with the synthetic incremental backup [1-3], as FSBAM 236.

At step 212, the backup module 110 combines the synthetic incremental backup [1-3] and the base backup to create the synthetic base backup [3]. The label "[3]" indicates that the synthetic base backup [3] includes the data from the base backup through the 3rd incremental backup. At step 212, the backup module 110 also stored a copy of the FSBAM 236 in the backup storage 108, along with the synthetic incremental backup [3], as FSBAM 238.

At steps 214 and 216, the backup module 110 creates 4th and 5th incremental backups at times t(4) and t(5), respectively. At step 218, the backup module 110 creates a synthetic incremental backup (4-5), which is a combination of the 4th and 5th incremental backups.

At step 220, the backup module 110 creates the synthetic base backup 5A, which is a combination of the base backup, the synthetic incremental backup [1-3], and the 4th and 5th incremental backups. Alternatively, at step 222 the backup module 110 creates the synthetic base backup 5B, which is a combination of the synthetic base backup [3] and the synthetic incremental backup [4-5]. It is noted that the synthetic base backup [5A] and the synthetic base backup [5B] are identical even though they were created by combining different backups, as each includes data from the base backup through the 5th incremental backup.

At step 224, the backup module 110 creates a 6th incremental backup at time t(6). Then the backup module 110 creates various additional incremental backups, finishing at step 226 with the creation of an nth incremental backup at time t(n). It is understood that during the steps 214-226, copies of the appropriate FSBAMs may be stored along with the incremental backups, the synthetic incremental backups, or the synthetic base backups being created as FSBAMs 240-252, respectively, as disclosed in FIG. 2.

As illustrated in the example method 200, incremental backups may be created on an ongoing basis. The frequency of creating new incremental backups may be altered as desired in order to adjust the amount of data that will be lost should the source storage 106 experience corruption of its stored data or become unavailable at any given point in time. In addition, the example method 200 illustrates that synthetic incremental and base backups may also be created on an ongoing basis in order to combine multiple sequential backups into a single backup.

Although not illustrated in FIG. 2, it is understood that after the creation of each synthetic backup, the previously-created incremental backups, both synthetic and non-synthetic, that represent the same point in time as the synthetic backup may be deleted from the backup storage 108 without any loss of ability to restore the source storage 106, since the synthetic backup represents the state of the source storage 106 at the same point in time. For example, the 3rd incremental backup and the synthetic incremental backup [1-3] may be deleted from the backup storage 108 after the creation of the synthetic base backup [3] without any loss of data or loss of ability to restore the source storage 106 to points in time of previous backups. In addition, where the ability to restore to points in time previous to the time of the synthetic backup is not desired, all previous backups combined into the synthetic backup may be deleted. For example, all backups created during steps 202-218 may be deleted from the backup storage 108 after the creation of the synthetic base backup [5A] or the synthetic base backup [5B] without any loss of data. Therefore, the creation of synthetic backups during the method 200 may result in the elimination of previously-created backups, thus decreasing the overall size requirements of the backup storage 108.

FIG. 3 is a schematic flowchart illustrating copies of the FSBAM 114 of the source storage 106 of FIG. 1 at various points in time that were stored with backups of the source storage. In particular, FIG. 3 illustrates portions of the copies 228, 230, 232, and 234 of the FSBAM 114 of the source storage 106 of FIG. 1 that were created at times t(0), t(1), t(2), and t(3), respectively, and stored with the base backup and the 1st, 2nd, and 3rd incremental backups, respectively. FIG. 3 also illustrates a portion of the copy 236 of the FSBAM 234 that were created at time t(3) and stored with the synthetic incremental backup [1-3]. As disclosed in FIG. 3, each of the FSBAMs 228-236 track the allocated and free blocks in the source storage 106 at their respective points in time having block positions (1)-(x), where x is the number of total blocks in the source storage 106. In some example embodiments, the size of each block in the source storage 106 is 4096 bytes, although any other block size could instead be employed. The size of each block may be configured to match the standard cluster size of a file system or the standard sector size of the source storage 106. The hatched block positions in FIG. 3 represent allocated blocks in the source storage 106 at the time indicated, and the blank blocks in FIG. 3 represent free blocks in the source storage 106 at the time indicated.

As disclosed in FIGS. 1-3, at time t(0) when the base backup is created and the FSBAM 228 is stored, along with the base backup, in the backup storage 108, the blocks at block positions (3), (5), and (8) are allocated. However, by time t(3) when the 3rd incremental backup is created and the FSBAM 234 is stored, along with the 3rd incremental backup, in the backup storage 108, the blocks at block positions (3), (5), and (8) are free. Therefore, during the creation of the synthetic incremental backup [1-3], although the blocks at block positions (3), (5), and (8) were previously allocated in the base backup, they are free in the most recent 3rd incremental backup and may therefore be pruned from the synthetic incremental backup [1-3], to the extent that they were contained in any of the 1st, 2nd, and 3rd incremental backups included in the synthetic incremental backup [1-3].

It is noted that since the block at block position (3) was not allocated at times t(1), t(2), and t(3) when the 1st, 2nd, and 3rd incremental backups were created, where these incremental backups include only changed allocated blocks (as opposed to including both changed allocated blocks and changed free blocks), the block at block position (3) will not be included in the 1st, 2nd, and 3rd incremental backups. However, even where these incremental backups include only changed allocated blocks, the blocks at block positions (5) and (8) may be included in this sequential set of incremental backups since the block at block position (5) remained allocated at time t(1) and the block at block position (8) remained allocated at times t(1) and t(2). Therefore, to the extent that either the blocks at block positions (5) and (8) changed between backups, they will be included in this sequential set of incremental backups.

In addition, during the creation of the synthetic base backup [3], although the blocks at block positions (3), (5), and (8) were previously allocated in the base backup, they are free in the FSBAM 236 of the synthetic incremental backup [1-3] and may therefore be pruned from the synthetic base backup [3].

Similarly, at time t(1) when the 1st incremental backup is created and the FSBAM 230 is stored, along with the 1st incremental backup, in the backup storage 108, the block at block position (11) is allocated. However, by time t(3) when the 3rd incremental backup is created and the FSBAM 234 is stored, along with the 3rd incremental backup, in the backup storage 108, the block at block position (11) is free. Therefore, during the creation of the synthetic incremental backup [1-3], although the block at block position (11) was previously allocated in the 1st incremental backup, the block is free in the most recent 3rd incremental backup and may therefore be pruned from the synthetic incremental backup [1-3], to the extent that this block was contained in any of the 1st, 2nd, and 3rd incremental backups included in the synthetic incremental backup [1-3]. Further, during the creation of the synthetic base backup [3], the block at block position (11) may be pruned from the synthetic base backup [3] to the extent that this block was contained in the base backup or in the synthetic incremental backup [1-3].

It is noted that since the block at block position (11) was not allocated at time t(0) when the base backup was created, where the base backup includes only allocated blocks (as opposed to including both allocated blocks and free blocks), the block at block position (11) will not be included in the base backup. However, where free blocks are included in the base backup, both the block at block position (11), as well as the blocks at block positions (2) and (6) may be pruned during the creation of the synthetic base backup [3].

Therefore, as illustrated in FIG. 3, the pruning of the free blocks during the creations of the synthetic incremental backup [1-3] and the synthetic base backup [3] may decrease the overall size requirements of the backup storage 108 where the synthetic incremental backup [1-3] and the synthetic base backup [3] are stored, decrease the bandwidth overhead of transporting the synthetic incremental backup [1-3] and the synthetic base backup [3] (such as over the network 112), decrease the processing time associated with collapsing the synthetic incremental backup [1-3] and the synthetic base backup [3] into subsequent synthetic backups (such as the synthetic base backup [5A] or [5B]), and decrease the processing time associated with restoring the synthetic incremental backup [1-3] and the synthetic base backup [3] due to their smaller overall size.

It is understood that the scale of only a handful of blocks being identified as previously-allocated free blocks in an FSBAM in FIG. 3 is for example purposes only, and in practice previously-allocated free blocks may number in the millions or billions of blocks. For example, a single digital movie file may include millions or billions of blocks, and the deletion of such a video file between backups included in a synthetic backup will result in millions or billions of blocks being pruned from the synthetic backup. The deletion of many such large files will result in many times the pruning during the creation of a synthetic backup. Similarly, common defragmentation of a storage between backups included in a synthetic backup can result in the rearranging and resulting freeing of millions or billions of blocks, resulting in millions or billions of blocks being pruned from the synthetic backup.

Figure 4:
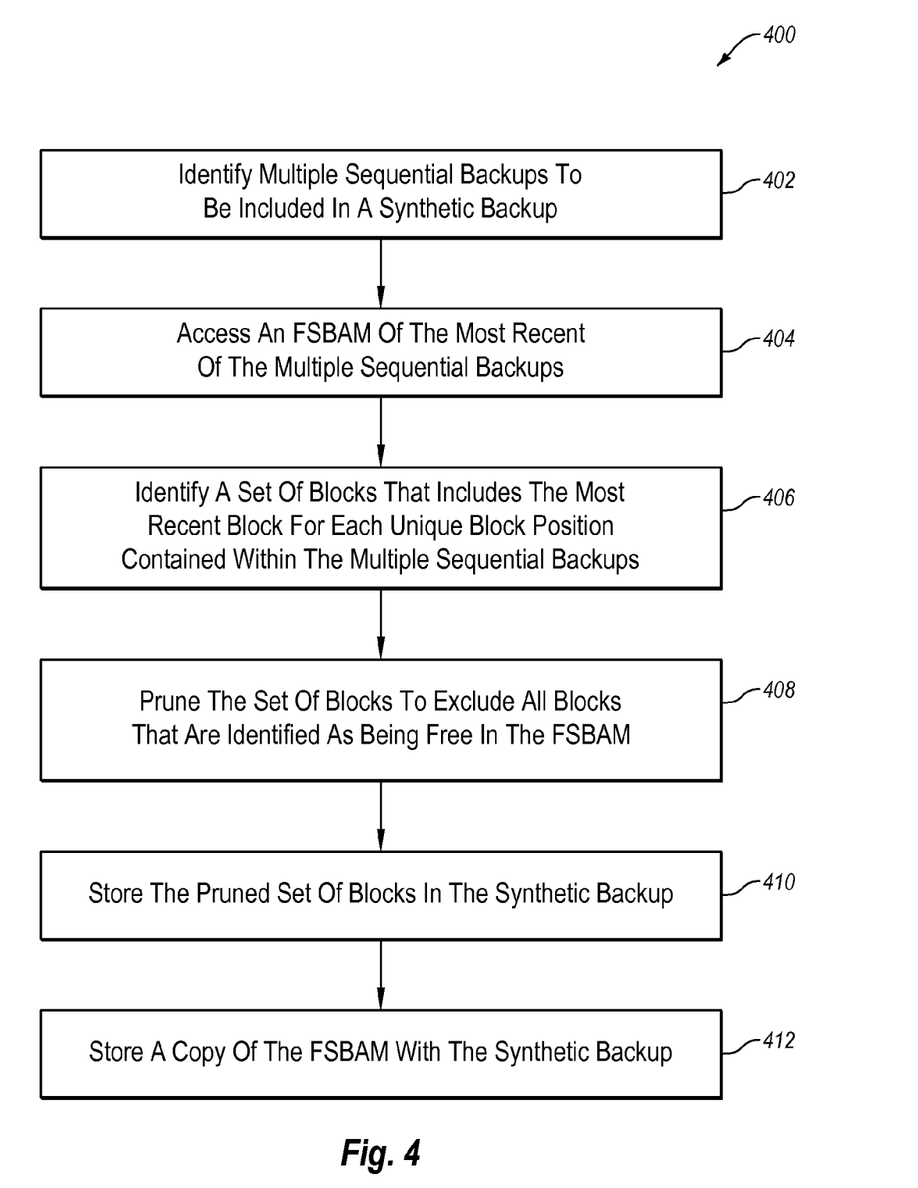
FIG. 4 is a schematic flowchart diagram of an example method of pruning previously-allocated free blocks from a synthetic backup.

FIG. 4 is a schematic flowchart diagram of an example method 400 of pruning previously-allocated free blocks from a synthetic backup. The method 400 may be implemented, in at least some embodiments, by the backup module 110 of the backup system 104 of FIG. 1. For example, the backup module 110 may be configured to execute computer instructions to perform operations of pruning previously-allocated free blocks from a synthetic backup of the source storage 106, as represented by one or more steps 402-412 of the method 400. Although illustrated as discrete steps, various steps may be divided into additional steps, combined into fewer steps, or eliminated, depending on the desired implementation. The method 400 will now be discussed with reference to FIGS. 1-4.

The method 400 may begin at step 402, in which multiple sequential backups are identified to be included in a synthetic backup. For example, the backup module 110 may identify the 1st, 2nd, and 3rd incremental backups to be included in the synthetic incremental backup [1-3].

At step 404, an FSBAM of the most recent of the multiple sequential backups is accessed. Continuing with the above example, the backup module 110 may access the FSBAM 234 of the 3rd incremental backup, since the 3rd incremental backup is the most recent of the 1st, 2nd, and 3rd incremental backups to be included in the synthetic incremental backup [1-3]. The FSBAM 234 may be accessed in a variety of ways, including any of the ways disclosed herein in connection with the discussion of FIG. 2.

At step 406, a set of blocks that includes the most recent block for each unique block position contained within the multiple sequential backups is identified. Continuing with the above example, the backup module 110 may identify a set of blocks for each unique block position contained within the 1st, 2nd, and 3rd incremental backups. Where more than one of the 1st, 2nd, and 3rd incremental backups includes a block for a unique block position, the backup module 110 will include only the most recent block for that block position, which is the block in the most recent backup. By way of illustration using the above example, if both the 1st and 2nd incremental backups include blocks at block positions (7) and (9) and the $3^{rd}$ incremental backup does not include blocks at block positions (7) and (9), then the backup module 110 will include only the blocks at block positions (7) and (9) from the 2nd incremental backup in the set of blocks identified at step 406. These blocks will come from the 2nd incremental backup because the 2nd incremental backup is the most recent of the 1st and 2nd incremental backups (which are the only two backups within the multiple sequential backups that are to be included in the synthetic incremental backup [1-3] that include blocks at block positions (7) and (9)), and therefore these blocks are the most recent blocks for unique block positions (7) and (9).

At step 408, the set of blocks is pruned to exclude all blocks that are identified as being free in the FSBAM. Continuing with the above example, the backup module 110 may prune the set of blocks identified at step 406 to exclude all blocks that are identified as being free in the FSBAM 234. For example, where any of the blocks at block positions (2), (3), (5), (6), (8), and (11) are included in the set of blocks identified at step 406, the backup module 110 may prune these blocks from the set of blocks, thereby decreasing the number of blocks that will ultimately be included in the synthetic incremental backup [1-3] at step 410.

It is understood that although the identification of the set of blocks at step 406 precedes the pruning of the set of blocks at 408, the pruning could occur prior to or simultaneously with the identification of the set of blocks. Therefore, it is not necessary that a block be included in the set of blocks at step 406 prior to being pruned from the set of blocks at step 408, and the "pruning" disclosed herein can instead prevent a block from ever being included in the set of blocks. In addition, although the accessing of the FSBAM at step 404 precedes the identification of the set of blocks at step 406 and the pruning at step 408, the accessing could occur simultaneously with the identification and/or the pruning.

At step 410, the pruned set of blocks is stored in the synthetic backup. Continuing with the above example, the backup module 110 may store the set of blocks that was identified at step 406, but then pruned at step 408, in the synthetic incremental backup [1-3]. It is understood that once these blocks have been stored in the synthetic incremental backup [1-3], the 3rd incremental backup may be deleted from the backup storage 108 without any loss of backup data or loss of the ability to restore the source storage 106 to the state at time t(3). Further, where the ability to restore to times t(1) and t(2) is not desired, the 1st and 2nd incremental backups may be deleted from the backup storage 108 without any loss of backup data.

At step 412, a copy of the FSBAM is stored with the synthetic backup. Continuing with the above example, the backup module 110 may store the FSBAM 236, which is a copy of the FSBAM 234, with the synthetic incremental backup [1-3]. This storing of the FSBAM 236 with the synthetic incremental backup [1-3] may be accomplished in a variety of ways, including any of the ways disclosed herein in connection with the storing of the FSBAM 234 with the 3rd incremental backup in the discussion of FIG. 2.

The embodiments described herein may include the use of a special purpose or general purpose computer, including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A non-transitory computer-readable medium storing a program that causes a processor to execute a method of pruning previously-allocated free blocks from an image-based synthetic backup, the method comprising:

Identifying multiple sequential image-based backups of source storage to be included in an image-based synthetic backup of the source storage, the multiple sequential image-based backup including a most recent image-based backup;

accessing a file system block allocation map (FSBAM) of the most recent image-based backup, the FSBAM indicating, as being free, block positions that were free in the source storage at a creation time of the most recent image-based backup;

identifying a set of allocated blocks that includes a most recent allocated block for each unique block position contained within the multiple sequential image-based backups;

pruning the set of allocated blocks to exclude at least some allocated blocks that correspond to block positions that are indicated as being free in the FSBAM, the excluded blocks including blocks that correspond to block positions that were previously allocated in the source storage prior to the creation time of the most recent image-based backup;

storing the pruned set of allocated blocks, and not storing the excluded allocated blocks, in the image-based synthetic backup, thereby decreasing the number of blocks that are stored in the image-based synthetic backup; and storing a copy of the FSBAM with the synthetic backup.

2. A non-transitory computer-readable medium storing a program that causes a processor to execute a method of pruning previously-allocated free blocks from an image-based synthetic backup, the method comprising:

identifying multiple sequential image-based backups of a source storage to be included in an image-based synthetic backup of the source storage, the multiple sequential image-based backups including a most recent image-based backup;

accessing a file system block allocation map (FSBAM) of the most recent image-based backup that was stored with the most recent image-based backup, the FSBAM indicating, as being free, block positions that were free in the source storage at a creation time of the most recent image-based backup;

identifying a set of allocated blocks that includes a most recent allocated block for each unique block position contained within the multiple sequential image-based backups;

pruning the set of allocated blocks to exclude at least some allocated blocks that correspond to block positions that are indicated as being free in the FSBAM, the excluded blocks including blocks that correspond to block positions that were previously allocated in the source storage prior to the creation time of the most recent image-based backup;

storing the pruned set of allocated blocks, and not storing the excluded allocated blocks, in the image-based synthetic backup, thereby decreasing the number of blocks that are stored in the image-based synthetic backup; and storing a copy of the FSBAM with the synthetic backup.

3. The non-transitory computer-readable medium as recited in claim 2, wherein the multiple sequential image-based backups include an image-based base backup.

4. The non-transitory computer-readable medium as recited in claim 2, wherein the multiple sequential image-based backups include an image-based synthetic base backup.

5. The non-transitory computer-readable medium as recited in claim 2, wherein the multiple sequential image-based backups include an image-based synthetic incremental backup.

6. The non-transitory computer-readable medium as recited in claim 2, wherein the FSBAM that was stored with the most recent image-based backup was stored as a separate data structure.

7. The non-transitory computer-readable medium as recited in claim 2, wherein accessing the FSBAM of the most recent image-based backup includes mounting the most recent image-based backup as a virtual device and querying a file system of the virtual device to expose the FSBAM embedded in the mounted most recent image-based backup.

8. The non-transitory computer-readable medium as recited in claim 2, wherein accessing the FSBAM of the most recent image-based backup includes parsing file system metadata contained within the most recent image-based backup to directly access the FSBAM that is embedded therein.

9. The non-transitory computer-readable medium as recited in claim 1, wherein the multiple sequential image-based backups include only image-based incremental backups and/or image-based synthetic incremental backups.

10. The non-transitory computer-readable medium as recited in claim 1, wherein the multiple sequential image-based backups include an image-based base backup and one or more image-based incremental backups.

11. The non-transitory computer-readable medium as recited in claim 1, wherein the multiple sequential image-based backups include an image-based synthetic base backup and one or more image-based non-synthetic incremental backups.

12. The non-transitory computer-readable medium as recited in claim 1, wherein the multiple sequential image-based backups include an image-based synthetic incremental backup and one or more image-based non-synthetic incremental backups.

13. The non-transitory computer-readable medium as recited in claim 1, wherein accessing the FSBAM of the most recent image-based backup includes directly accessing the FSBAM that was stored with the most recent image-based backup as a separate data structure.

14. The non-transitory computer-readable medium as recited in claim 1, wherein accessing the FSBAM of the most recent image-based backup includes mounting the most recent image-based backup as a virtual device and querying a file system of the virtual device to expose the FSBAM embedded in the mounted most recent image-based backup.

15. The non-transitory computer-readable medium as recited in claim 1, wherein accessing the FSBAM of the most recent image-based backup includes parsing file system metadata contained within the most recent image-based backup to directly access the FSBAM that is embedded therein.

16. The non-transitory computer-readable medium as recited in claim 2, wherein the multiple sequential image-based backups include only image-based incremental backups.

* * * * *